(12) United States Patent
Porter

(10) Patent No.: US 8,107,741 B2
(45) Date of Patent: Jan. 31, 2012

(54) INTRA MOTION PREDICTION FOR RESPONSE TIME COMPENSATION

(75) Inventor: Allen Porter, Sunderland (CA)

(73) Assignee: Broadcom Corporation, Irvine, CA (US)

( * ) Notice: Subject to any disclaimer, the term of this patent is extended or adjusted under 35 U.S.C. 154(b) by 1115 days.

(21) Appl. No.: 11/864,362

(22) Filed: Sep. 28, 2007

(65) Prior Publication Data

US 2009/0087108 A1    Apr. 2, 2009

(51) Int. Cl.
*G06K 9/00* (2006.01)
(52) U.S. Cl. .......................................... 382/232
(58) Field of Classification Search .................. 382/232, 382/245, 246, 248, 250, 251; 348/751, 792, 348/793; 345/87, 88, 90, 95
See application file for complete search history.

(56) References Cited

U.S. PATENT DOCUMENTS

| | | | |
|---|---|---|---|
| 7,421,135 B2 * | 9/2008 | Kondo et al. | 382/239 |
| 2004/0114817 A1 * | 6/2004 | Jayant et al. | 382/239 |
| 2005/0105815 A1 * | 5/2005 | Zhang et al. | 382/251 |
| 2005/0225522 A1 | 10/2005 | Wu et al. | |
| 2005/0254576 A1 * | 11/2005 | Huang | 375/240.03 |
| 2006/0098879 A1 | 5/2006 | Kim et al. | |
| 2006/0152501 A1 | 7/2006 | Furihata et al. | |
| 2006/0274832 A1 * | 12/2006 | Ducloux et al. | 375/240.16 |

OTHER PUBLICATIONS

European Patent Office, Communication with extended European Search Report, in Application No. 08800401.5, dated Dec. 17, 2010.

* cited by examiner

*Primary Examiner* — Jason M Repko
*Assistant Examiner* — Shervin Nakhjavan
(74) *Attorney, Agent, or Firm* — Thomas, Kayden, Horstemeyer & Risley, LLP

(57) ABSTRACT

An apparatus for a response time compensation system includes a plurality of complexity modules and a motion vector module. The complexity modules determine a plurality of complexity values based on current image information and prior image information. The motion vector module determines a desired complexity value based on a lowest of complexity values. The motion vector determines a desired motion vector based on the lowest of the plurality of complexity values. The desired complexity value and the desired motion vector are used to compress the current image information into a compressed bitstream. The compressed bitstream is used by the response time compensation system to provide display element response time compensation information for a display.

13 Claims, 10 Drawing Sheets

INTRA MOTION PREDICTION FOR RESPONSE TIME COMPENSATION

RELATED CO-PENDING APPLICATIONS

This application is related to co-pending applications entitled "COMPRESSION METHOD AND APPARATUS FOR RESPONSE TIME COMPENSATION", filed on an even date, having Ser. No. 11/864,412, inventor Allen Porter, owned by instant Assignee and is incorporated herein in its entirety by reference; and "RESPONSE TIME COMPRESSION USING A COMPLEXITY VALUE OF IMAGE INFORMATION", filed on an even date, having Ser. No. 11/864,391, inventor Allen Porter, owned by instant Assignee and is incorporated herein in its entirety by reference.

FIELD

The present disclosure generally relates to response time compensation for a display, and more particularly, to a method and apparatus for compressing information used for response time compensation of display elements.

BACKGROUND

A Liquid Crystal Display (LCD) displays images using optical variations caused by injecting and arranging liquid crystal display elements between two glass plates and then applying a voltage to change the arrangement of the liquid crystal display elements. In an LCD, a current image can overlap a previous image due to a slow response time causing blurring. For example, one frame typically has a duration of approximately 16.7 ms when display refresh is 60 Hz. When a voltage is applied to both ends of a liquid crystal material, a physical torque is generated which begins to re-orient the liquid crystal material. The more torque (voltage) the quicker the liquid crystal material responds and the further it moves. By modulating the torque applied to the liquid crystal material, the materials response (and hence color changing accuracy) can be improved. Slow pixel response causes the visual effect of blurring.

To improve response speed of an LCD, response time compensation such as dual frame overdrive or multiple frame overdrive can be used. When using dual frame overdrive, a difference between a pixel value of a previous frame for an arbitrary pixel and a pixel value of a current frame for the pixel is obtained, and a sum of a value proportional to the difference and the pixel value of the current frame is generated. These values can then be used as indices to a LUT (with or without interpolation) to derive the most optimal logic driving value. Multiple frame overdrive operates in a similar manner as dual frame overdrive, but two consecutive previous frames are used rather than a single previous frame. In order to use either overdrive technique, the pixel values of previous frames must be stored in memory.

Accordingly, it is desirable to, among other things, minimize the size of the previous frames stored in memory when using response time compensation in order to improve performance of an LCD.

BRIEF DESCRIPTION OF THE DRAWINGS

The invention will be more readily understood in view of the following description when accompanied by the below figures, wherein like reference numerals represent like elements.

DETAILED DESCRIPTION

Figure 1:
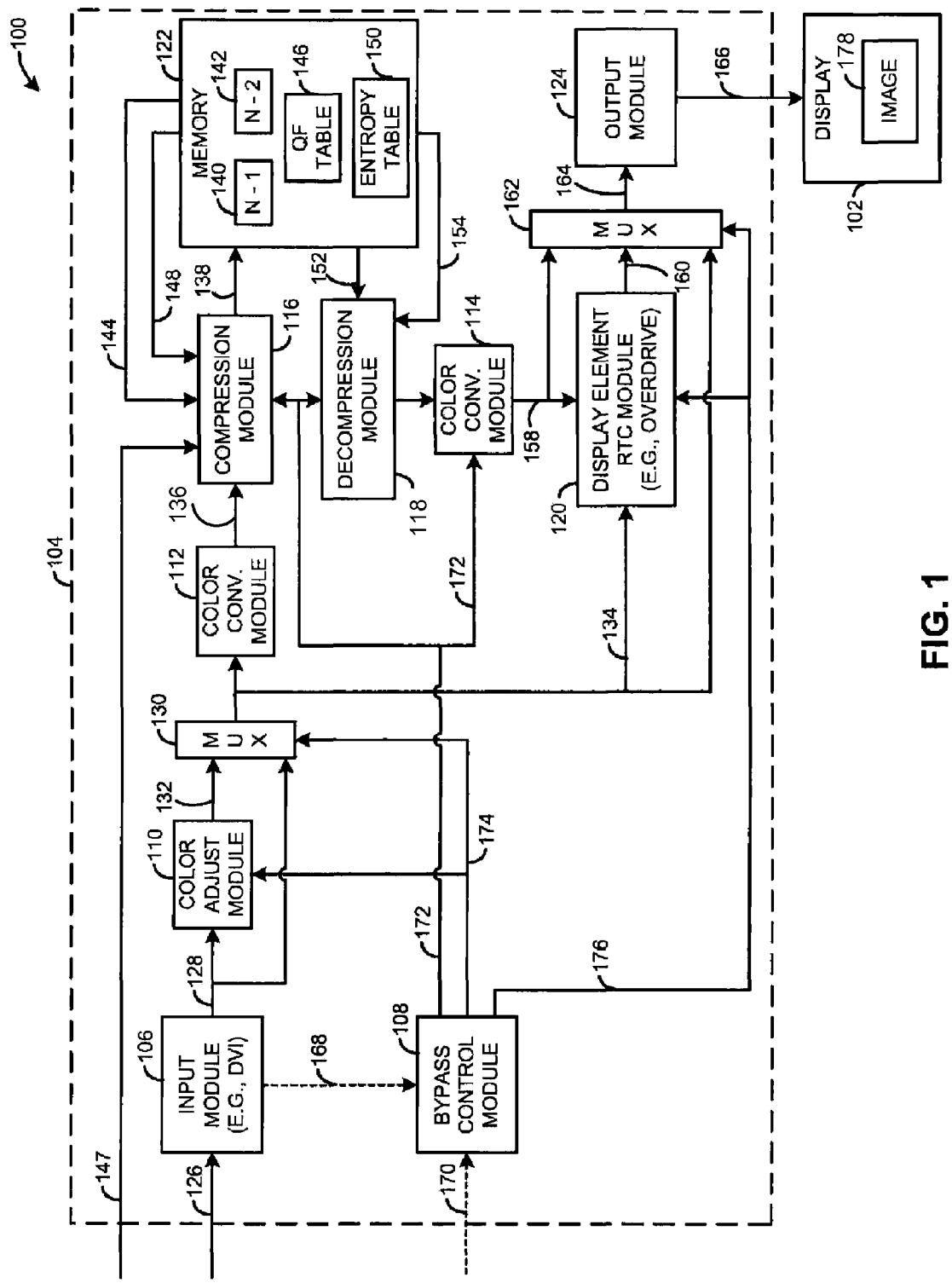
FIG. 1 is an exemplary functional block diagram of a device that includes a response time compensation and compression system.

In one example, an apparatus for a response time compensation system includes a plurality of complexity modules and a motion vector module. The complexity modules determine a plurality of complexity values based on current image information and prior image information. The motion vector module determines a desired complexity value based on a lowest of complexity values. The motion vector module determines a desired motion vector based on the lowest of the plurality of complexity values. The desired complexity value and the desired motion vector are used to compress the current image information into a compressed bitstream. The compressed bitstream is used by the response time compensation system to provide display element response time compensation information for a display. A related method is also disclosed.

The method and apparatus provide, among other advantages, previous frames of image information that are compressed which minimizes information stored in memory when using response time compensation to improve performance of a display. In addition, power consumption is minimized by selectively powering down and/or bypassing the compression module, decompression module, and/or the display element response time compensation module when the modules are not needed due to the display mode of the display. Other advantages will be recognized by those of ordinary skill in the art.

In one example, at least one of the complexity values is based on a mean absolute difference of a plurality of blocks of the image information and at least one of the plurality of complexity values is based on a mean absolute difference of a plurality of blocks of the prior image information.

In one example, the intra motion prediction apparatus includes a motion prediction shifting module. The motion prediction shifting module provides the prior image information by time and spatially shifting the current image information.

In one example, an integrated circuit includes the intra motion prediction apparatus. In one example, a device includes a display and the intra motion prediction apparatus.

As used herein, the term "module" can include an electronic circuit, one or more processors (e.g., shared, dedicated, or group of processors such as but not limited to microprocessors, DSPs, or central processing units), and memory that execute one or more software or firmware programs, combinational logic circuits, an ASIC, an integrated circuit, and/or other suitable components that provide the described functionality. Additionally, as will be appreciated by those of ordinary skill in the art, the operation, design, and organization, of a "module" can be described in a hardware description language such as Verilog, VHDL, or other suitable hardware description languages. Unless otherwise stated, the term "power down" refers to removing (or lowering) the source power of a "module" rendering it inoperative. In addition, the term "power up" refers to adding (or increasing) the source power of a "module" rendering it operative.

Referring now to FIG. 1, an exemplary functional block diagram of a device 100 such as a liquid crystal display (LCD) television, an LCD monitor, an LCD panel, a mobile phone, a printer, a personal digital assistant, and/or other suitable device having a liquid crystal display 102 is shown. The device 100 includes a response time compensation and compression system 104 and the display 102. The response time compensation and compression system 104 includes an input module 106, a bypass control module 108, a color adjustment module 110, a first color conversion module 112, a second color conversion module 114, a compression module 116, a decompression module 118, a display element response time compensation (RTC) module 120, memory 122, and an output module 124.

The input module 106 receives image information 126 that includes at least one color component such as red, green, and/or blue (RGB). The input module 106 sends image information 128 to the color adjustment module 110, which corrects color content (e.g., gamma, white balance), and a first multiplexer 130, which serves as a bypass. The color adjustment module 110 performs color correction on the image information 128 as known in the art and provides adjusted color information 132 to the multiplexer 130. The multiplexer 130 provides combined color information 134 to the color conversion module 112 based on the image information 128 and/or the adjusted color information 132.

The color conversion module 112 converts the combined color information 134 from RGB information into YCrCb information 136 using a YCrCb transform as known in the art. When transforming to the YCrCb information 136 the color conversion module 112 maintains sufficient color depth information to ensure that an accurate reverse conversion can be achieved by the color conversion module 114.

The compression module 116 compresses a current frame of the YCrCb information 136 to provide compressed information 138, which is stored in memory as a previous frame 140 and a prior previous frame 142 (e.g., the frame prior to the previous frame 140). The compression module 116 uses intra prediction combined with frequency domain quantization and a variable length compression method to provide the compressed information 138. The number of frames of storage can be predetermined based on requirements of the display element RTC module 120.

As will be discussed in greater detail, the compression module 116 determines a complexity value of the YCrCb information 136 based on a mean absolute difference of blocks of the YCrCb information 136. The compression module 116 also determines previously processed image information for subsequent use by the compression module 116 based on the mean absolute difference of blocks of the YCrCb information 136. The compression module 116 transforms the YCrCb information 136 from spatial domain information to frequency domain information. In addition, the compression module 116 determines a block quantization factor (QF) based on the complexity value of a selected block of image information, QF table information 144 from a QF table 146, and a difference between a target number of bits 147, which can be predetermined, allocated to pack the compressed information 138 into a bitstream and an actual number of bits used to pack the compressed information into the bitstream. Furthermore, the compression module 116 uses the QF table information 144 to quantize the frequency domain information and then uses entropy information 148 from an entropy table 150 to variable length encode the quantized frequency domain information.

The decompression module 118 receives prior compressed information 152 from memory 122. The prior compressed information 152 can be based on the previous frame 140 (n−1) when using dual frame overdrive or can be based on the previous frame 140 (n−1) and the prior previous frame 142 (n−2) when using multiple frame overdrive. The decompression module 118 decompresses the prior compressed information 152 based on entropy information 154 from the entropy table 150 and the quantization factor to provide decompressed prior image information 156 to the second color conversion module 114. The second color conversion module 114 converts the decompressed prior image information 156 from YCrCb information to prior image RGB information 158 using an inverse YCrCb transform as known in the art.

The display element RTC module 120 performs any known response time compensation method such as dual frame overdrive, multiple frame overdrive, and/or any other suitable response time compensation method. The display element RTC module 120 provides display element RTC information 160 based on the prior image RGB information 158 and a current frame of combined color information 134 that is based on either the adjusted color information 132 or the image information 128.

For example, when using dual frame overdrive, the display element RTC module 120 determines a difference between a pixel value of the previous frame 140 (n−1) and an arbitrary pixel of a current frame of the combined color information 134. A sum of a value proportional to the difference and the pixel value of the current frame is output as the display element RTC information 160. These values are typically used as inputs to a lookup table to determine the correct display driving level. When using multiple frame overdrive, the display element RTC module 120 uses both the previous frame 140 (n−1) and the prior previous frame 142 (n−2) to provide the display element RTC information 160.

A second multiplexer 162 provides display element information 164 based on the combined color information 134, the prior image RGB information 158, or the display element RTC information 160. The output module 124 receives the display element information 164 and provides display information 166 to the display 102. The display 102 displays an image 178 based on the display information 166 as known in the art.

The bypass control module 108 selectively controls multiplexers 130, 162 based on a change in display mode information 168, 170 via bypass control information 172, 174, 176 to cause image information 128 to bypass the color adjustment module 110 and/or the color conversion module 112, the second color conversion module 114, the compression module 116, the decompression module 118, the display element RTC module 120, and memory 122. In some embodiments, the bypass control information 172, 174, 176 can also be used to selectively power down the color conversion module 112, the compression module 116, the decompression module 118, the second color conversion module 114, and/or the display element RTC module 120 when the respective modules 112, 114, 116, 118, 120 are bypassed.

In some embodiments, the display mode information 168 is based on the image information 126. In other embodiments, the display mode information 170 can be received from a low power mode driver (not shown) executed by a processor (not shown) of the device 100. The display mode information 168, 170 can include various operating modes of the device 100 such as a dynamic image mode (e.g., the image information 126 is a moving image such as video image), a still image mode (e.g., the image information 126 is a static image such as a photograph), a lost input information mode (e.g., the image information 126 does not contain valid image information), a low power mode (e.g., the low power driver has the device 100 operating in a low power mode), and/or any other suitable operating mode of the device 100.

When the display mode information 168, 170 changes to either the lost input information mode or the low power mode, the bypass control module 108 controls the multiplexer 162 so that the display element information 164 is based solely on the prior image RGB information 158 rather than both the prior image RGB information 158 and the current frame of combined color information 134.

When the display mode information 168, 170 changes to the still image mode, the bypass control module 108 controls the multiplexer 162 so that the display element information 164 is based on the combined color information 134 (e.g., the still image) and not the prior image RGB information 158.

In this manner, the bypass control module 108 can reduce power consumption of the response time compensation and compression system 104 by selectively powering down and/or bypassing the compression module 116, decompression module 118, and/or the display element RTC module 120 when the modules are not needed due to the change in display mode conditions. Additional power savings may also be realized by upstream components (not shown) that no longer need to refresh the display 102 via the input module 106.

Figure 2:
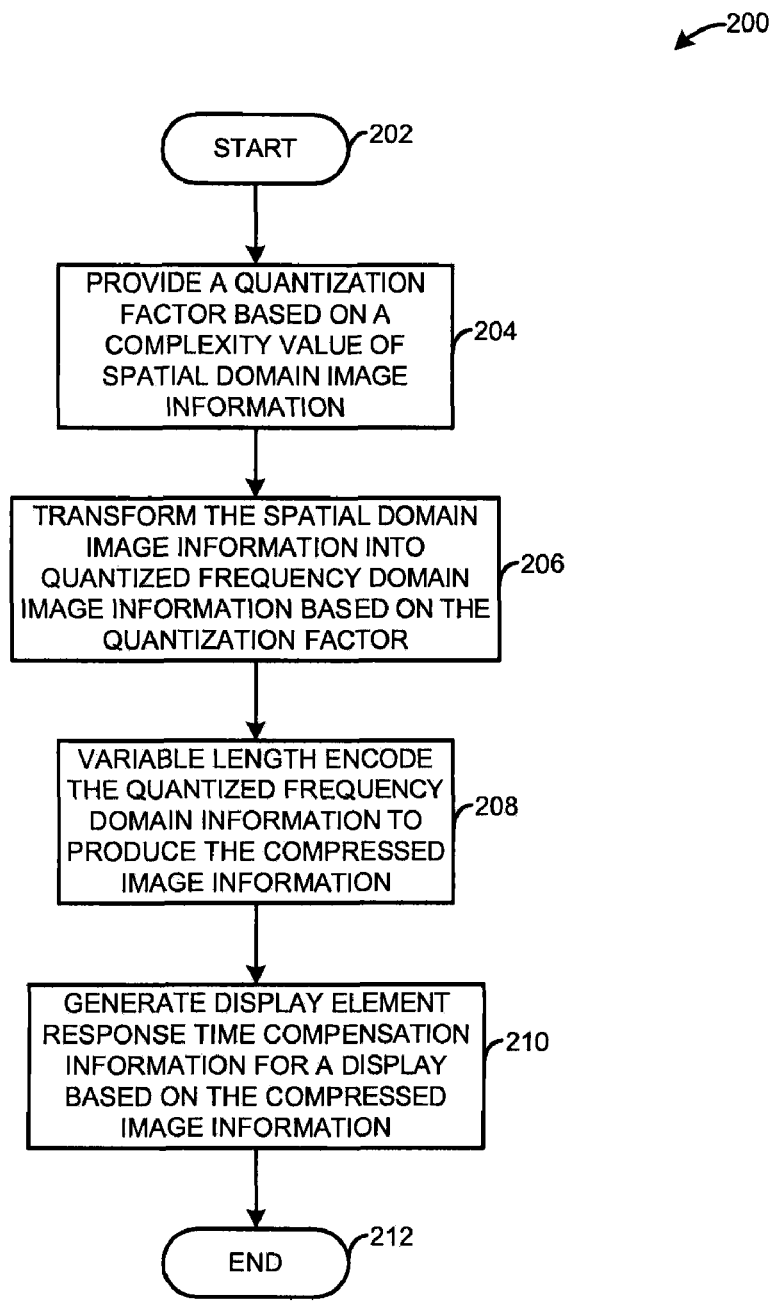
FIG. 2 is a flowchart depicting exemplary steps that can be taken by the response time compensation and compression system.

Referring now to FIG. 2, exemplary steps that can be taken by the response time compensation and compression system 104 to provide the display element RTC information 160 are generally identified at 200. The process starts in step 202 when the compression module 116 receives the YCrCb information 136. In step 204, the compression module 116 determines a quantization factor based on a complexity value which is based on a mean absolute difference of the spatial domain YCrCb information 136. In step 206, the compression module 116 transforms the spatial domain YCrCb information 136 into quantized frequency domain information based on the quantization factor. In step 208, the compression module 116 variable length encodes the quantized frequency information to produce the compressed information 138. In step 210, the display element RTC module 120 generates the display element RTC information 160 based on the prior image RGB information 158, which is based on the compressed image information 138. The process ends in step 212.

Figure 3:
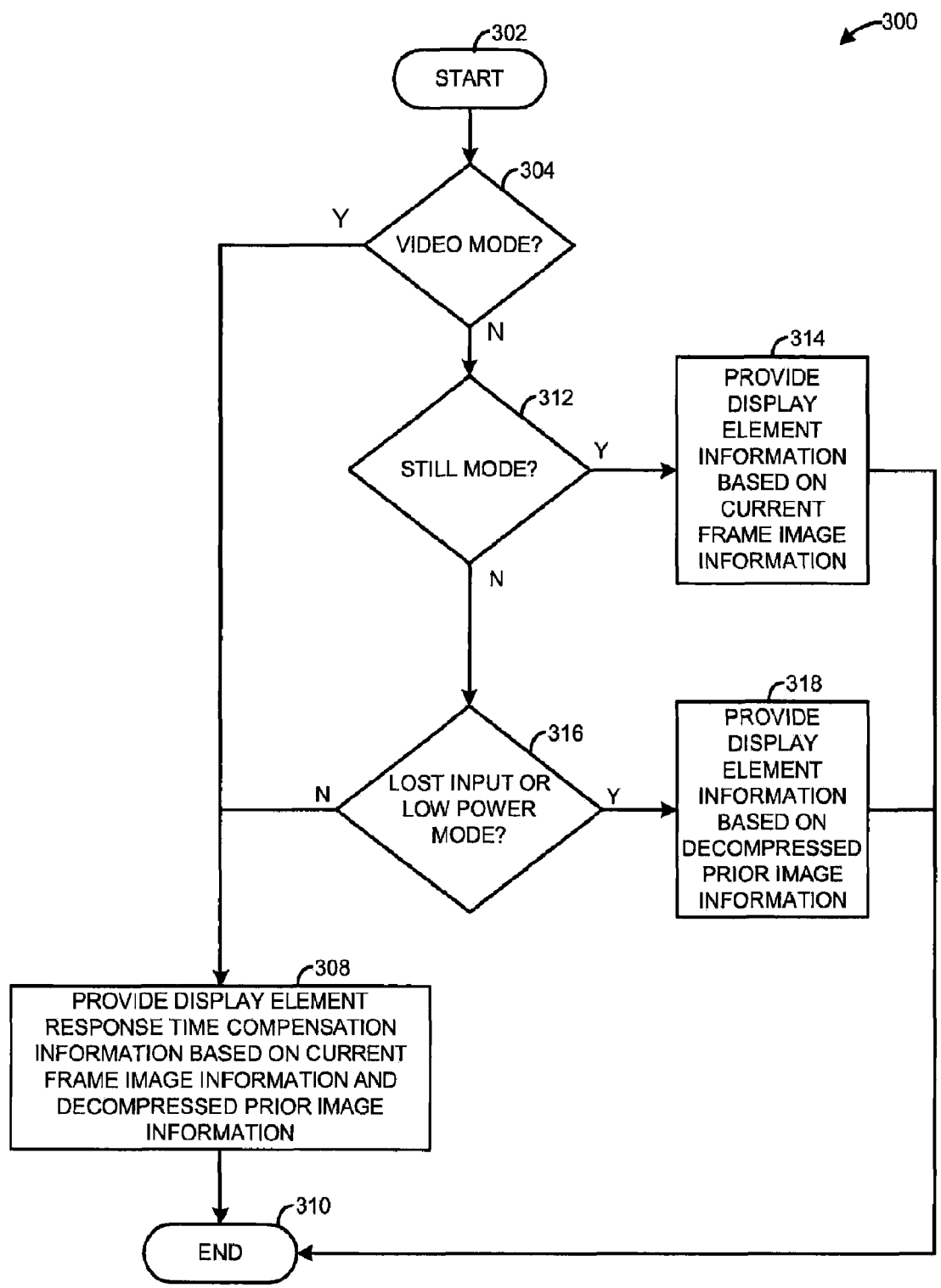
FIG. 3 is a flowchart depicting exemplary steps that can be taken by the response time compensation and compression system using display mode information.

Referring now to FIG. 3, exemplary steps that can be taken by the response time compensation and compression system 104 using the display mode information 168, 170 are generally identified at 300. The process starts in step 302. In steps 304, 312, and 316, the bypass control module 108 determines which mode the display 102 is operating in based on the display mode information 168, 170. If the display mode information 168, 170 indicates the dynamic image mode (e.g., video) in step 304, the bypass control module 108 controls the multiplexers 130, 162 so that the display element RTC module 120 provides the display element RTC information 160 based on both the prior image RGB information 158 and the combined color information 134 in step 308 and the process ends in step 310.

If the bypass control module 108 display mode information 168, 170 does not indicate the dynamic mode (e.g., video) in step 304, the bypass control module 108 determines whether the display mode information 168, 170 indicates the still image mode in step 312. If the display 102 is operating in the still image mode, the bypass control module 108 controls the multiplexers 130, 162 so that the display element RTC module 120 is bypassed and the display element information 164 is based on the current frame of combined color information 134 in step 314 and the process proceeds to step 310.

If the bypass control module 108 determines that the display 102 is not operating in the still image mode in step 312, the bypass control module 108 determines whether the display is operating in the lost input information mode or the low power mode in step 316. If the display 102 is operating in either the lost input information mode or the low power mode, the bypass control module 108 controls the multiplexers 130, 162 so that the output module 124 is provided with the prior image RGB information 158, which is based on the decompressed prior image information 156, in step 318 and the process proceeds to step 310.

Figure 4:
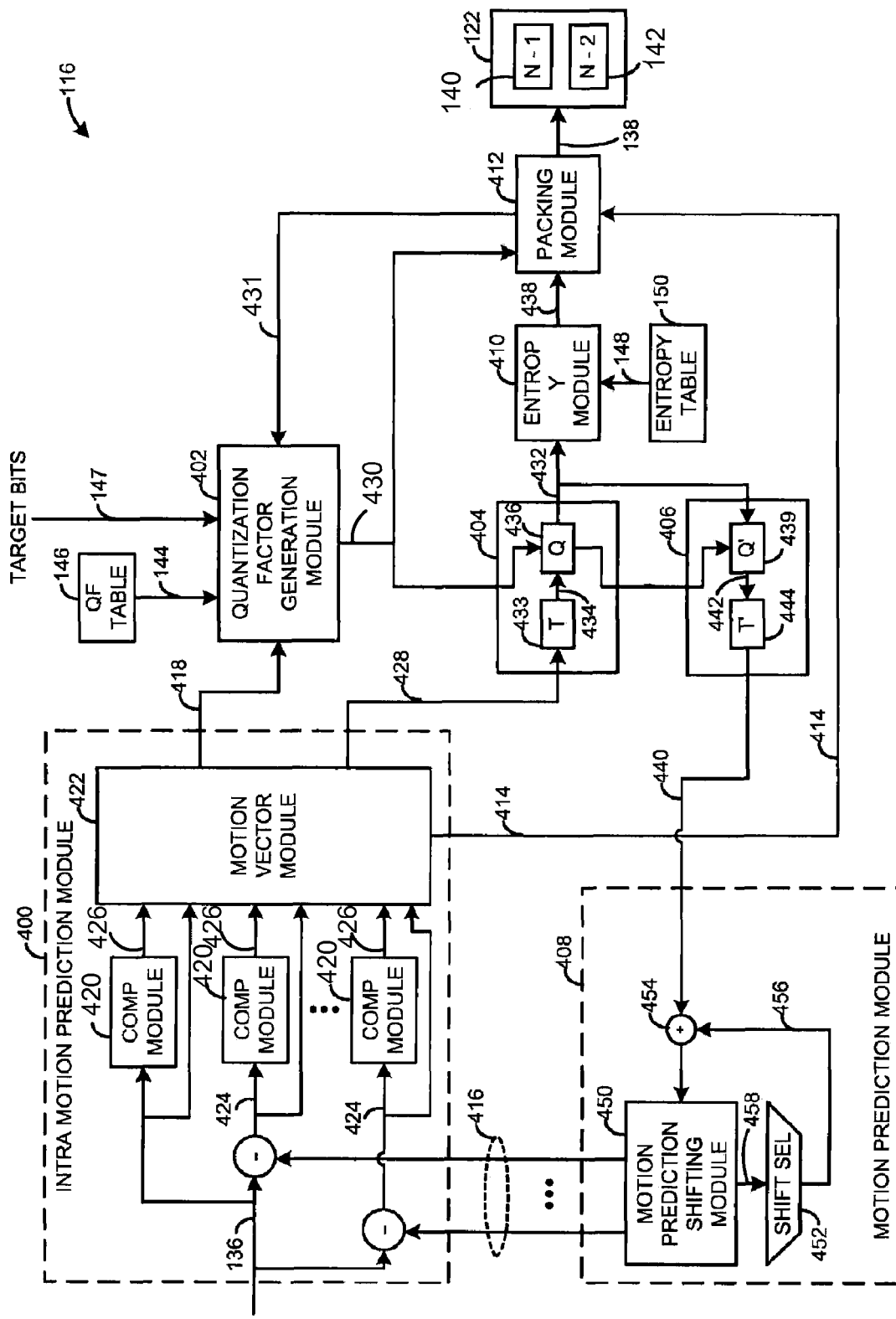
FIG. 4 is an exemplary functional block diagram of a compression module of the response time compensation and compression system.

Referring now to FIG. 4, a functional block diagram of the compression module 116 is depicted. The compression module 116 includes an intra motion prediction module 400, a quantization factor generation module 402, a transform quantization module 404, an inverse transform quantization module 439, a motion prediction module 408, an entropy module 410, and a packing module 412.

The intra motion prediction module 400 determines desired (i.e., optimal) motion vector information 414 based on the current YCrCb information 136 and prior image information 416. In addition, the intra motion prediction module 400 provides a complexity value 418 of the image information 136 or the prior image information 416.

The intra motion prediction module 400 includes a plurality of complexity modules 420 and a motion vector module 422. In some embodiments there are a total of 28 complexity modules 420 although more or less complexity modules 420 can be used. The motion vector module 422 provides the complexity value 418 based on the image information 136 and/or the prior image information 416, which ever produces the lowest complexity value.

The complexity modules 420 sum a mean absolute difference between each block of the image information 136 (or prior image information 424) to determine a plurality of complexity values 426. The motion vector module 422 provides the desired (i.e., optimal) motion vector information 414 by selecting a prior motion vector corresponding to prior image information 416 having a lowest of the plurality of complexity values 426. In addition, the motion vector module 422 provides processed image information 428 that includes the current YCrCb information 136 and the prior image difference information 424.

As will be discussed in more detail, the quantization factor generation module 402 determines quantization factor information 430 based on the target number of bits 147, a number of bits used 431 to pack the compressed information 138 into a bitstream, the complexity value 418, and QF table information 144 from the QF table 146.

The transform quantization module 404 provides quantized frequency domain information 432 based on the processed image information 428 and the quantization factor information 430. More specifically, a transform module 433 receives the processed image information 428, which is in the spatial domain, and transforms the processed image information 428 into frequency domain image information 434. The transform module 433 transforms the processed image information 428 into frequency domain image information 434 using any suitable transform such as, for example, a discrete cosine transform, an integer transform or any other suitable transform known in the art. A quantization module 436 provides the quantized frequency domain information 432 based on the quantization factor information 430 and the frequency domain image information 434.

The entropy module 410 variable length encodes the quantized frequency domain information 432 into variable length encoded information 438 using the entropy information 148 from the entropy table 150. As known in the art, entropy encoding is a data compression scheme that assigns codes to symbols so as to match code lengths with the probabilities of the symbols. In order to maximize compression, the shortest code lengths are used for the most commonly used symbols. The entropy module 410 uses the entropy table 150, which includes predetermined symbol and code values determined using Huffman coding as known in the art. Although Huffman coding is used in this example, other known entropy coding methods can be used such as, for example, arithmetic coding.

The packing module 412 receives the variable length encoded information 438 and packs the variable length encoded information 438, the motion vector information 414, and the quantization factor information 430 into a bitstream of compressed image information 138. In some embodiments, the motion vector information 414 and the quantization factor information 430 can also be entropy encoded prior to being packed into the bitstream of compressed image information 138.

In addition, the packing module 412 provides the number of bits used 431 to pack the compressed information 138 into the bitstream. As previously noted, the quantization factor generation module 402 uses the number of bits used 431 to pack the compressed information 138 into the bitstream to determine the quantization factor information 430.

The inverse transform quantization module 406 provides unquantized spatial domain image information 440 based on the quantized frequency domain information 432. More specifically, an inverse quantization module 439 provides unquantized frequency domain information 442 based on the quantized frequency domain information 432 and the quantization factor information 430. An inverse transform module 444 receives the unquantized frequency domain information 442 and transforms the unquantized frequency domain information 442 into the unquantized spatial domain image information 440. The inverse transform module 444 uses an inverse transform of the transform used by the transform module 433 such as, for example, an inverse discrete cosine transform or integer transform as known in the art.

The motion prediction module 408 provides the prior image information 416 based on the unquantized spatial domain image information 440. More specifically, the motion prediction module 408 provides the prior image information 416 by shifting prior unquantized spatial domain image information 440 in order to provide "time and spatially shifted" image information based on previous image information 136.

The motion prediction module 408 includes a motion prediction shifting module 450, a shifting selection module 452, and a summation module 454. The summation module 454 provides compensated image information 458 based on a sum of unquantized spatial domain image information 440 and previously processed image information 456 that is "time and spatially shifted." The motion prediction shifting module 450 provides the prior image information 416 based on the unquantized spatial domain image information 440 and previously processed image information 456. The shift selection module 452 provides the previously processed image information 456 based on time and spatially shifted image information 458.

Figure 5:
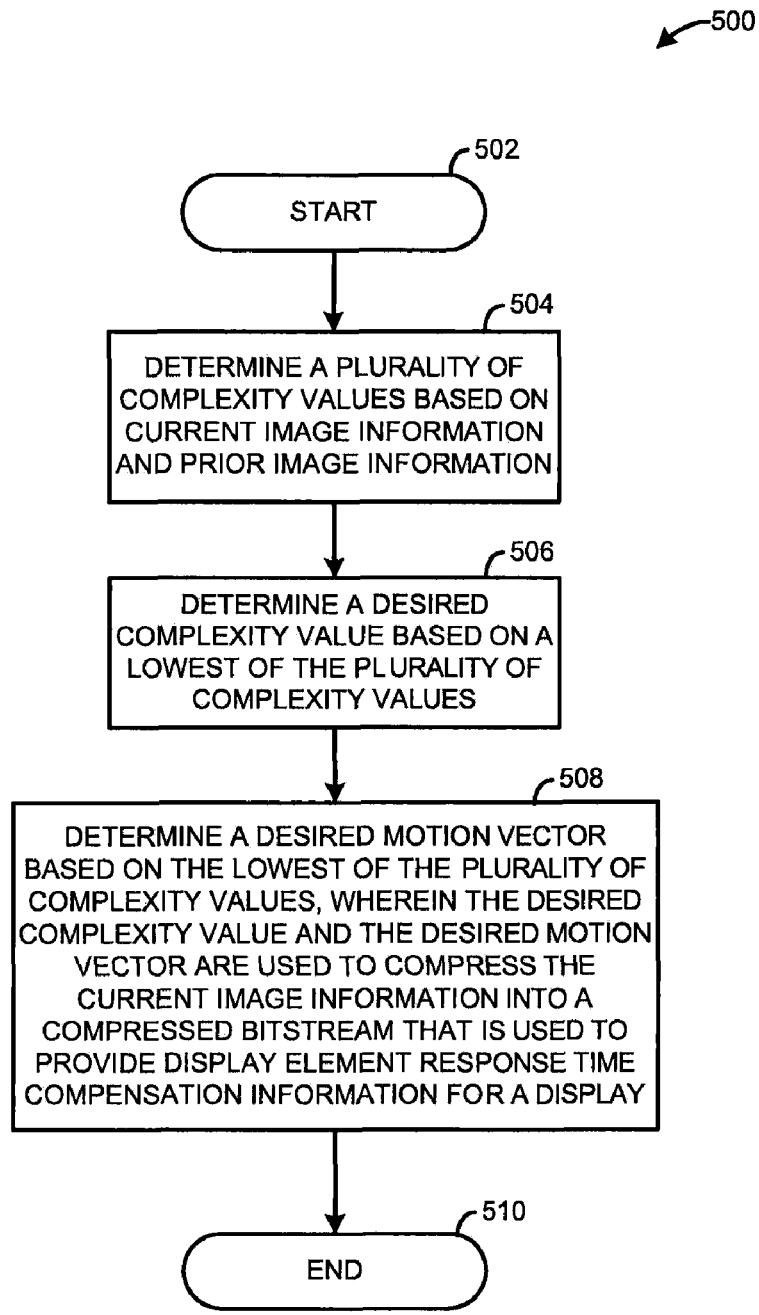
FIG. 5 is a flowchart depicting exemplary steps that can be taken by an intra motion prediction module of the response time compensation and compression system.

Referring now to FIG. 5, exemplary steps that can be taken by the intra motion prediction module 400 when determining the motion vector 414 and the complexity value 418 are generally identified at 500. The process starts in step 502 when the complexity module 420 receives the current YCrCb image information 136. In step 504, the plurality of complexity modules 420 determine the plurality of complexity values 426 based on the current YCrCb information 136 and the prior image information 416. In step 506, the motion vector module 422 determines the desired complexity value 418 based on a lowest of the plurality of complexity values 426. In step 508, the motion vector module determines the desired (i.e., optimal) motion vector based on a lowest of the plurality of complexity values 426. As previously discussed, the desired complexity value 418 and the desired motion vector 414 are used by the response time compensation and compression system 104 to compress the current YCrCb image information 136 into the compressed bitstream of compressed information 138, which is used to provide display element RTC information 160 for the display 102. The process ends in step 510.

Figure 6:
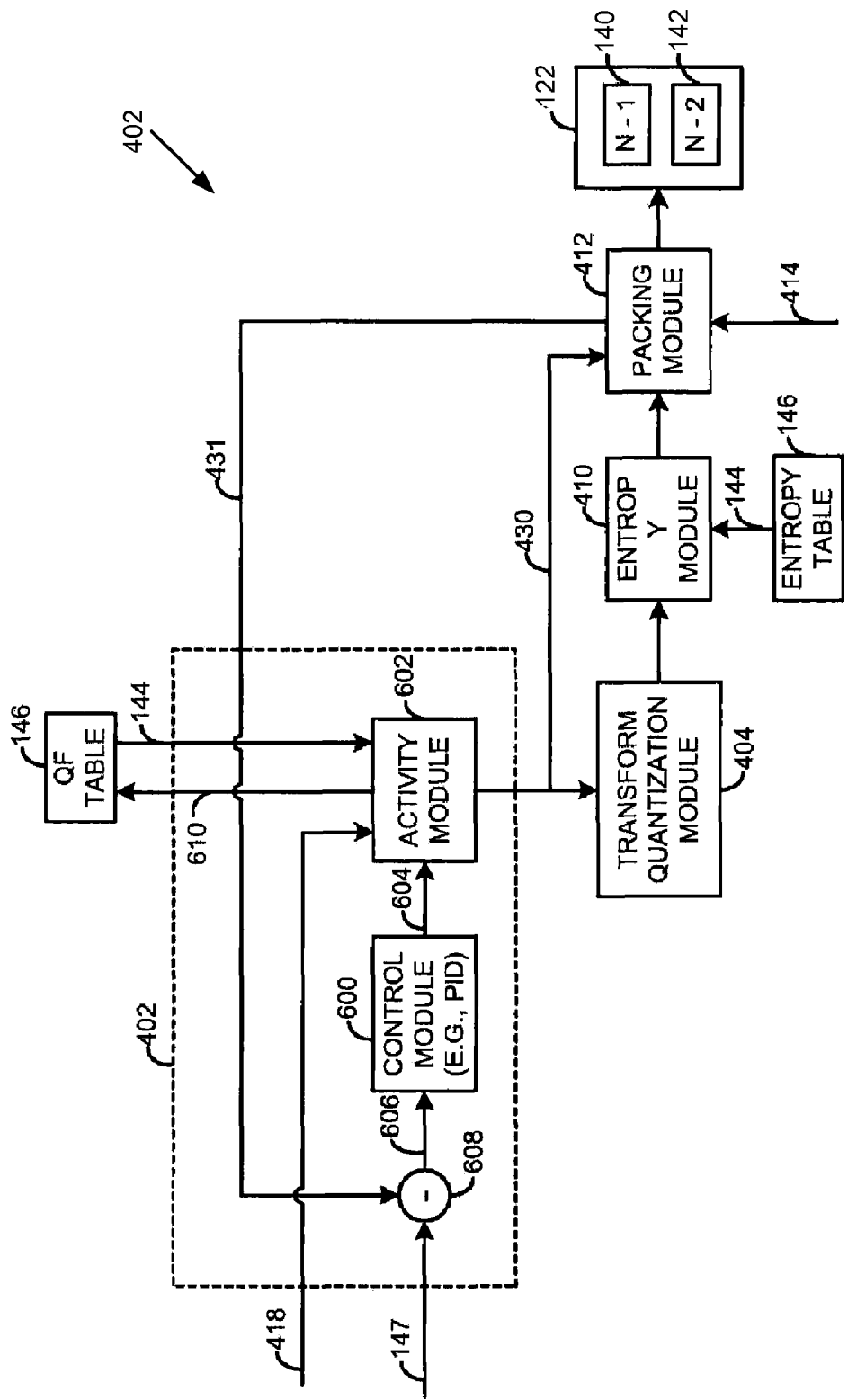
FIG. 6 is an exemplary functional block diagram of a quantization factor generation module of the response time compensation and compression system.

Referring now to FIG. 6, an exemplary block diagram of the quantization factor generation module 402 is depicted. The quantization factor generation module 402 includes a control module 600 and an activity module 602. In some embodiments, the control module 600 is a proportional-integral-derivative (PID) controller that is responsive to previous error control information as is commonly known in the art. Other controllers are contemplated such as, for example, a PI controller, a PD controller, or other suitable controllers.

The control module 600 provides error control information 604 based on the target number of bits 147 and the number of bits used 431 to pack the compressed information 138 into a bitstream. More specifically, the control module 600 provides the error control information 604 based on a difference 606 between the target number of bits 147 and the number of bits used 431 to pack the compressed information 138 into a bitstream. Although depicted externally, the control module 600 can include a difference module 608 to determine the difference 606.

The activity module 602 provides the quantization factor information 430 based on the error control information 604 and the complexity value 418. More specifically, the activity module 602 accesses the QF table 146 using QF table query information 610 that includes the error control information 604 and the complexity value 418, and retrieves the QF table information 144 based on the error control information 604 and the complexity value 418. As such, the QF table 146 can be a predetermined lookup table that includes empirically determined quantization factors based on the error control information 604 and the complexity value 418. The QF table 146 can return the quantization factor information 430 via indexed values based on the complexity value 418 and the error control information 604. In addition, the activity module 602 can interpolate a quantization factor when the values in the QF table do not match up one for one.

Figure 7:
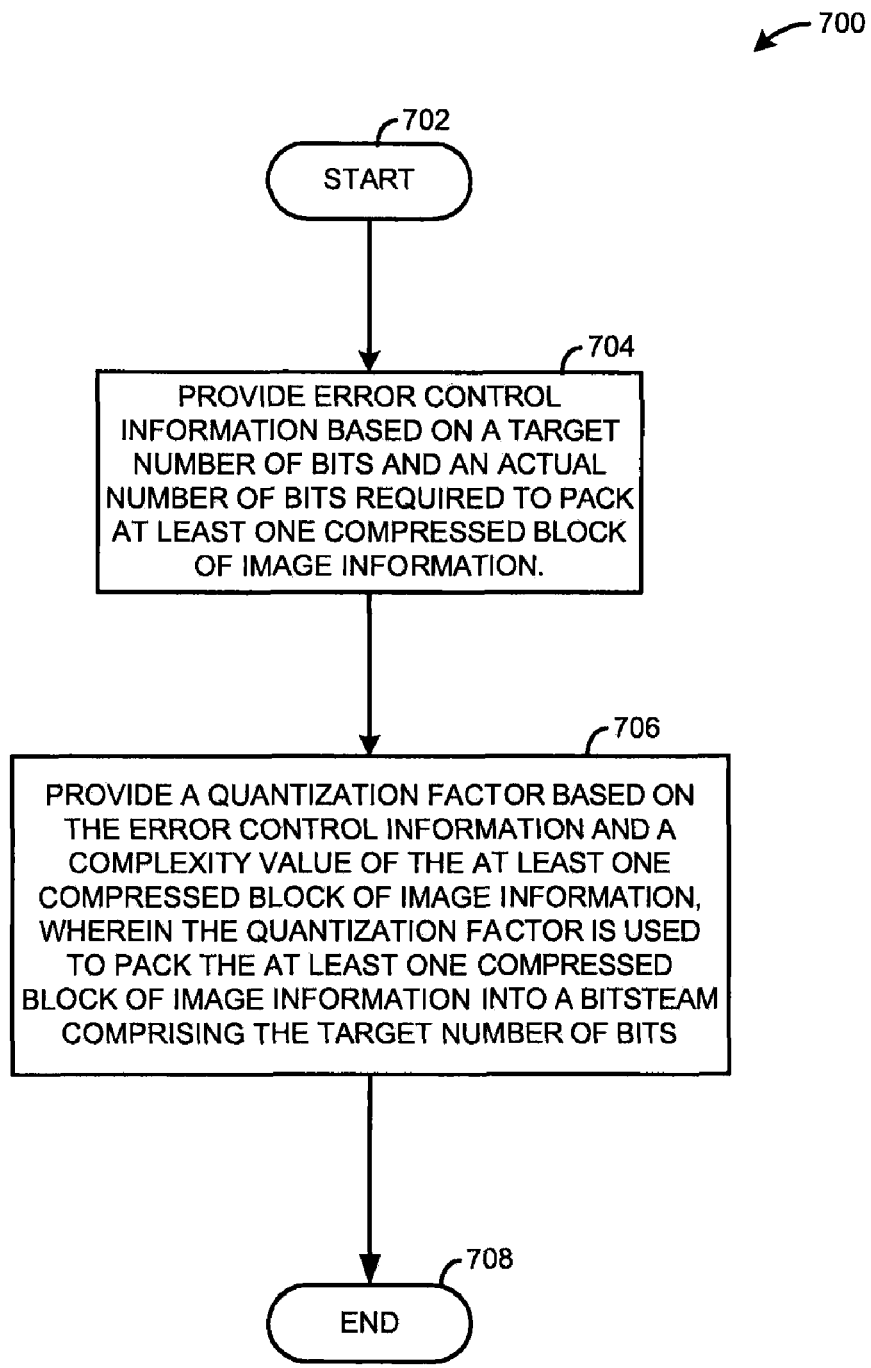
FIG. 7 is a flowchart depicting exemplary steps that can be taken by the quantization factor generation module.

Referring now to FIG. 7, exemplary steps that can be taken by the quantization factor generation module 402 to provide the quantization factor information 430 are generally identified at 700. The process starts in step 702. In step 704, the control module 600 provides the error control information 604 based on the target number of bits 147 and the number of bits used 431 to pack the compressed information 138 into a bitstream. In step 706, the activity module 602 provides the quantization factor information 430 based on the error control information 604 and the complexity value 418. As previously noted, the activity module 602 accesses the QF table 146 to obtain QF table information 144 that is based on the error control information 604 and the complexity value 418 in order to determine the quantization factor information 430. The process ends in step 708.

Figure 8:
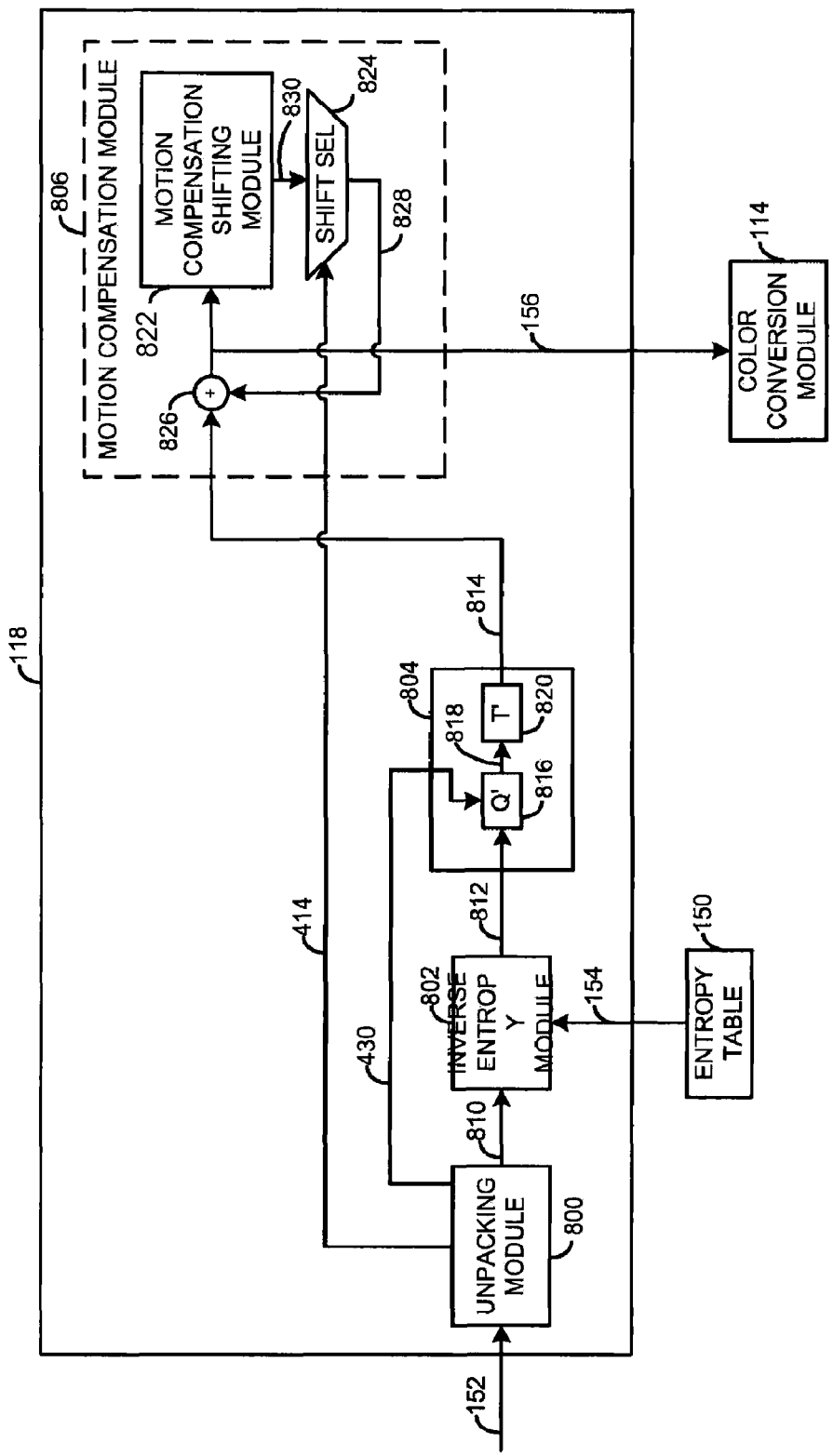
FIG. 8 is an exemplary functional block diagram of a decompression module of the response time compensation and compression system.

Referring now to FIG. 8, an exemplary functional block diagram of the decompression module 118 is depicted. The decompression module 118 essentially performs the inverse operation of the compression module 116. However, the decompression module 118 does not need to determine a quantization factor since the compression module 116 provides the decompression module 118 with the quantization factor information 430 via the prior compressed information 152.

The decompression module 118 includes an unpacking module 800, an inverse entropy module 802, an inverse transform quantization module 804, and a motion compensation module 806. The unpacking module 800 receives a bitstream of the prior compressed information 152 from memory 122 and unpacks the bitstream to provide unpacked prior compressed information 810. In addition, the unpacking module 800 unpacks the motion vector information 414 and the quantization factor information 430 from the prior compressed information 152.

The inverse entropy module 802 variable length decodes the unpacked compressed image information 810 based on entropy information 154 from the entropy table 150 to provide decoded quantized image information 812. The inverse entropy module 802 essentially performs the inverse operation of the entropy module 410 to variable length decode the unpacked compressed image information 810.

The inverse transform quantization module 804 provides unquantized spatial domain image information 814 based on the decoded quantized image information 812. More specifically, an inverse quantization module 816 provides unquantized frequency domain information 818 based on the decoded quantized image information 812, which is in the frequency domain, and the quantization factor information 430. An inverse transform module 820 receives the unquantized frequency domain information 818 and transforms the unquantized frequency domain information 818 into the unquantized spatial domain image information 814. The inverse transform module 820 uses an inverse transform of the transform used by the transform module 433 such as, for example, an inverse discrete cosine transform or integer transform as known in the art.

The motion compensation module 806 includes a motion compensation shifting module 822, a shift selection module 824, and a summation module 826. The summation module 826 provides the image information 156 based on a sum of the unquantized spatial domain image information 814 and previously processed image information 828 that is "time and spatially shifted." The motion compensation shifting module 822 provides time and spatially shifted image information 830 based on the unquantized spatial domain image information 814 and previously processed image information 828. The shift selection module 824 provides the previously processed image information 828 based on the time and spatially shifted image information 830 and the motion vector information 414.

Figure 9:
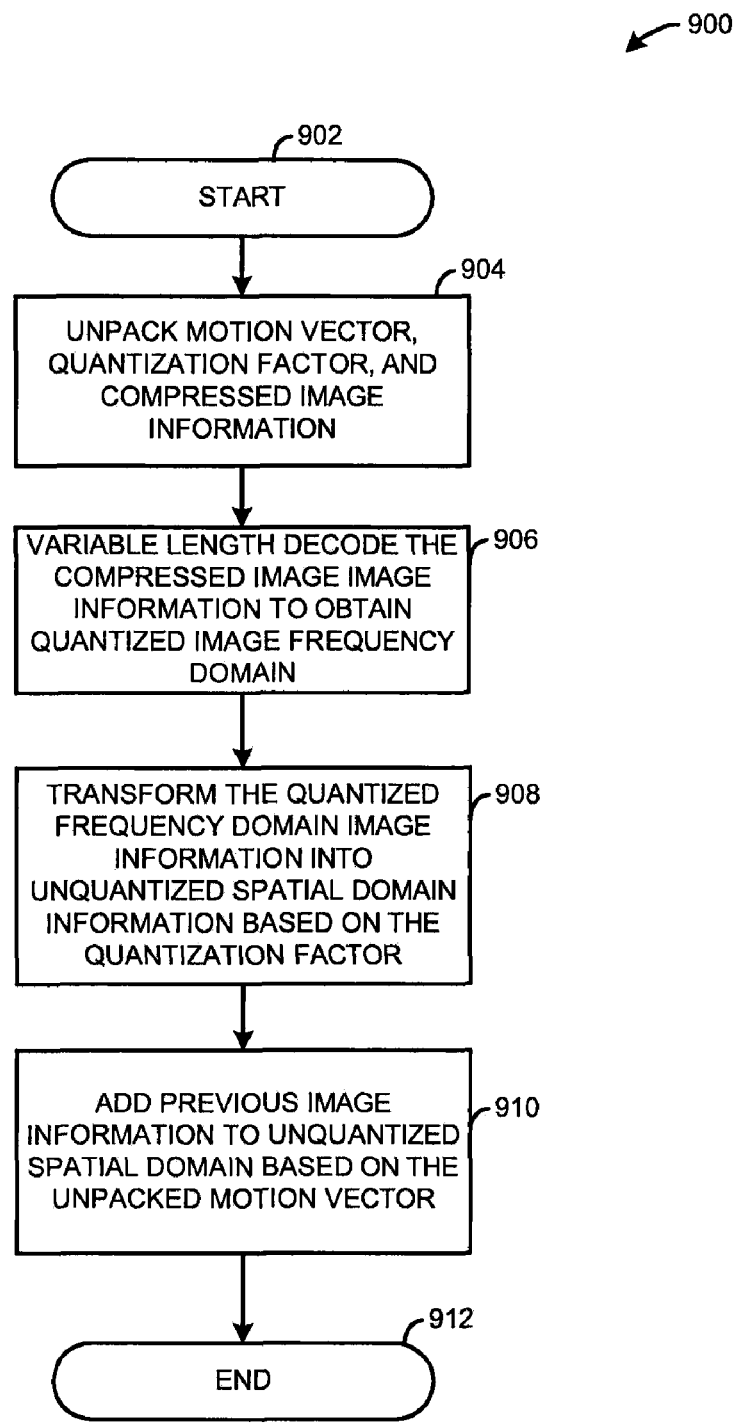
FIG. 9 is a flowchart depicting exemplary steps that can be taken by the decompression module.

Referring now to FIG. 9, exemplary steps that can be taken by the decompression module 118 are generally identified at 900. The process starts in step 902. In step 904, the unpacking module 800 unpacks the compressed information 152 to provide the motion vector information 414, the quantization factor information 430, and the unpacked compressed image information 810. In step 906, the inverse entropy module 802 variable length decodes the unpacked compressed image information 810 based on the entropy information 154 from the entropy table 150 to provide the decoded quantized image information 812. In step 908, the inverse transform quantization module 804 transforms the decoded quantized image information 812 into the unquantized spatial domain image information 814 based on the quantization factor 430. In step 910, the motion compensation module 806 adds the previously processed image information 828 to the previously processed image information 828 based on the motion vector 414 to provide the image information 156 for the color conversion module 114.

Figure 10:
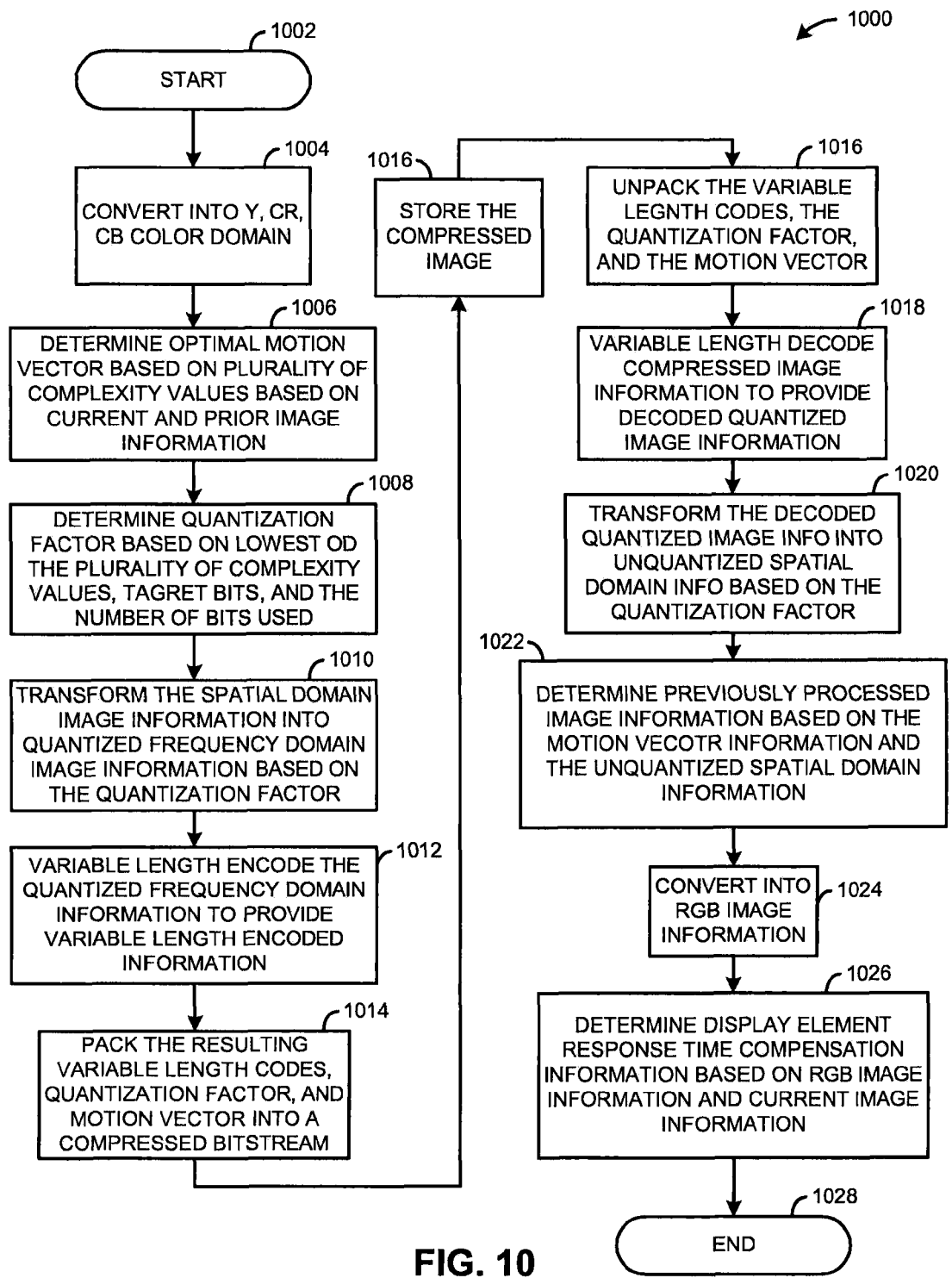
FIG. 10 is a flowchart depicting additional exemplary steps that can be taken by the response time compensation and compression system.

Referring now to FIG. 10, exemplary steps that can be taken by the response time compensation and compression system 104 are generally identified at 1000. The process start in step 1002 when the input module 106 receives the RGB image information 126. In step 1004, the color conversion module 112 converts the color information 134, which is based on the RGB information 126, into YCrCb information 136 using a YCrCb transform as known in the art. In step 1006, the motion vector module 422 determines the optimal motion vector 414 based on the plurality of complexity values 426 that are based on the YCrCb information 136 and the prior image information 416. In step 1008, the quantization factor generation module 402 determines the quantization factor information 430 based on the complexity value 418 (e.g., the lowest of the plurality of complexity values 426), the target bits 147, and the number of bits used 432 to pack the compressed information 138 into a bitstream.

In step 1010, the transform quantization module 404 transforms the processed image information 428, which is in the spatial domain, into quantized frequency domain information 432 based on the quantized factor information 430. In step 1012, the entropy module 410 variable length encodes the quantized frequency domain information 432 based on the entropy information 148 to provide the variable length encoded information 438. In step 1014, the packing module 412 packs the variable length encoded information 438, the quantization factor information 430, and the motion vector information 414 into a bitstream of compressed image information 138. As previously discussed, the quantization factor information 430, and the motion vector information 414 can also be variable length encoded using the entropy information 148 prior to being packed into the bitstream of compressed image information 138. In step 1016, the compressed image information 138 is stored in memory 122 as the previous frame 140 (n−1) and/or the prior previous frame 142 (n−2).

In step 1016, the unpacking module 800 of the decompression module 118 unpacks the motion vector information 414, the quantization factor information 430, and the compressed image information 810 from the prior compressed information 152. In step 1018, the inverse entropy module 802 variable length decodes the compressed image information 810 based on the entropy information 154 to provide the decoded quantized image information 812. In step 1020, the inverse transform quantization module 804 transforms the decoded quantized image information 812 into the unquantized spatial domain image information 814.

In step 1022, the motion compensation module 806 determines previously processed image information 828 based on the motion vector information 414 and the unquantized spatial domain image information 814. In step 1024, the color conversion module 114 converts the decompressed prior image information 156, which is the sum of the previously processed image information 828 and the unquantized spatial domain image information 814, into the prior image RGB information 158 using an inverse YCrCb transform. In step 1026, the display element RTC module 120 determines the display element RTC information 160 based on the prior image RGB information 158 and the current image information 134. The process ends in step 1028.

As noted above, among other advantages, previous frames of image information are compressed which minimizes information stored in memory when using response time compensation to improve performance of a display. In addition, power consumption is minimized selectively powering down and/or bypassing the compression module, decompression module, and/or the display element response time compensation module when the modules are not needed due to the display mode of the display. Furthermore, the system can maintain a static display image while upstream components are powered down. Other advantages will be recognized by those of ordinary skill in the art.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. An apparatus for a response time compensation system, comprising:
    a plurality of complexity modules that are operative to determine a plurality of complexity values based on current image information and prior image information; and
    a motion vector module that is operative to determine a desired complexity value based on a lowest of the plurality of complexity values and to determine a desired motion vector based on the lowest of the plurality of complexity values, wherein the desired complexity value and the desired motion vector is used to compress the current image information into a compressed bitstream.

2. The apparatus of claim 1 wherein the response time compensation system uses the compressed bitstream to provide display element response time compensation information for a display.

3. The apparatus of claim 2 further comprising a display that is operative to display an image based on the display element response time compensation information.

4. The apparatus of claim 1 wherein at least one of the plurality of complexity values is based on a mean absolute difference of a plurality of blocks of the current image information and at least one of the plurality of complexity values is based on a mean absolute difference of a plurality of blocks of the prior image information.

5. The apparatus of claim 1 further comprising a motion prediction shifting module that is operative to provide the prior image information by time and spatially shift the current image information.

6. A method for response time compensation, comprising:
    determining a plurality of complexity values based on current image information and prior image information;
    determining a desired complexity value based on a lowest of the plurality of complexity values; and
    determining a desired motion vector based on the lowest of the plurality of complexity values, wherein the desired complexity value and the desired motion vector are used to compress the current image information into a compressed bitstream.

7. The method of claim 6 wherein the compressed bitstream is used to provide display element response time compensation information for a display.

8. The method of claim 6 wherein at least one of the plurality of complexity values is based on a mean absolute difference of a plurality of blocks of the current image information and at least one of the plurality of complexity values is based on a mean absolute difference of a plurality of blocks of the prior image information.

9. The method of claim 6 further comprising providing the prior image information by time and spatially shifting the current image information.

10. A non-transitory computer readable medium comprising information that when executed by at least one processor causes the at least one processor to:
    determine a plurality of complexity values based on current image information and prior image information;
    determine a desired complexity value based on a lowest of the plurality of complexity values;
    and determine a desired motion vector based on the lowest of the plurality of complexity values, wherein the desired complexity value and the desired motion vector are used to compress the current image information into a compressed bitstream.

11. The non-transitory computer readable medium of claim 10 wherein the compressed bitstream is used to provide display element response time compensation information for a display.

12. The non-transitory computer readable medium of claim 10 wherein the information comprises hardware description language.

13. The non-transitory computer readable medium of claim 10 wherein the information describes a circuit to determine the plurality of complexity values, to determine the desired complexity value, and to determine the desired motion vector.

* * * * *